(No Model.)
I. LACKEY.
Plate Glass Conveyer and Setter.
No. 242,003. Patented May 24, 1881.
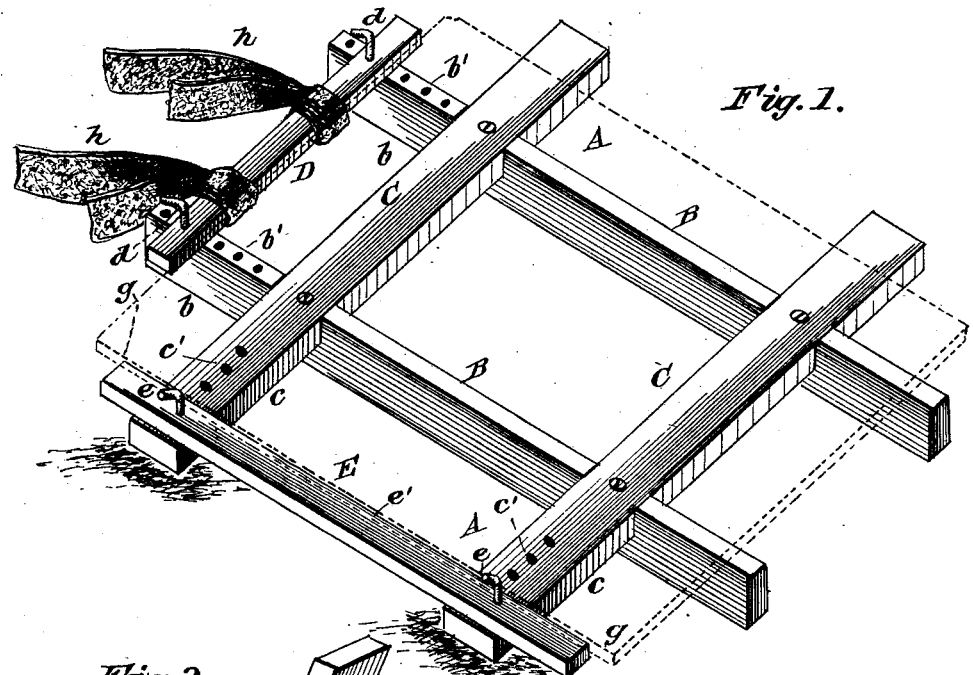
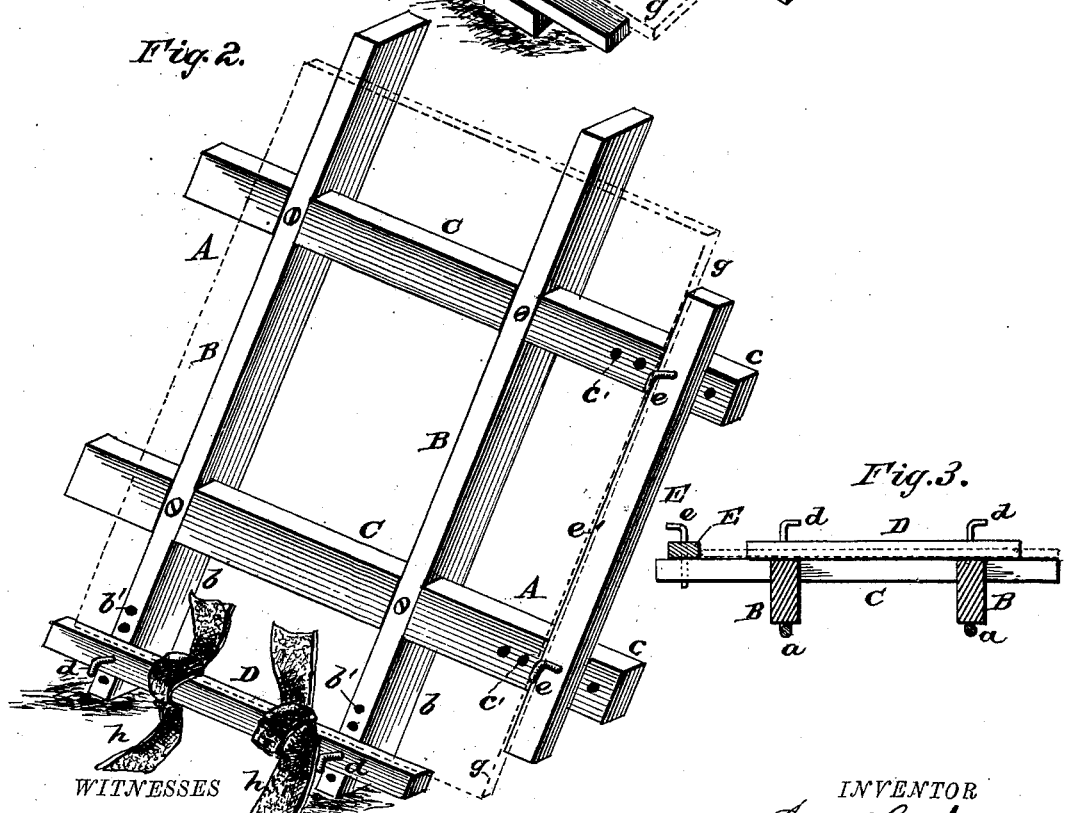
WITNESSES
Fred. G. Dieterich
P. C. Dieterich
By his Attorney
INVENTOR
Ira Lackey
De Witt C. Allen.
N. PETERS, Photo-Lithographer, Washington, D. C.

UNITED STATES PATENT OFFICE.

IRA LACKEY, OF BLOOMINGTON, ILLINOIS.

PLATE-GLASS CONVEYER AND SETTER.

SPECIFICATION forming part of Letters Patent No. 242,003, dated May 24, 1881.

Application filed April 1, 1881. (No model.)

*To all whom it may concern:*

Be it known that I, IRA LACKEY, of Bloomington, in the county of McLean, and in the State of Illinois, have invented certain new and useful Improvements in Plate-Glass Conveyers and Setters; and I do hereby declare that the following is a full, clear, and exact description thereof, reference being had to the accompanying drawings, and to the letters of reference marked thereon, making a part of this specification, and in which—

Figure 1 is a perspective view of my conveyer. Fig. 2 is a similar view, showing the same in a different position; and Fig. 3 is a transverse section of the same.

My invention relates to an improved device especially designed for conveying and setting plate-glass; and the invention consists in novel features of construction and combination and arrangement of parts, all as will be hereinafter fully described, and specifically pointed out in the claims.

In the drawings, A represents a rectangular frame, composed of the longitudinal beams B B and transverse bars or beams C C, which cross the bars or beams B B, and are rabbeted therein, so that the upper surfaces of all of the bars or beams are flush with each other, with their ends projecting beyond the crossing or intersecting points, all as clearly shown in Fig. 1. The ends $b\ b$ of the beams or bars B B are provided with a series of holes, $b'\ b'$, by which the transverse bar or rest D, connected thereto by bolts or pins $d\ d$, may be adjusted thereon. The ends $c\ c$ of the bars or beams C C are also provided with a series of holes, $c'\ c'$, by which the longitudinal bar or rest E, connected thereto by pins or bolts $e\ e$, may be adjusted thereon.

When it is desired to convey and set a plate-glass in a door or window frame, the glass, which is generally greater in length than width, is placed lengthwise on the frame, so that the edge $g$ will rest against the side or upper edge, $e'$, of the rest or bar E, the frame and glass being at a sufficient angle to prevent the glass from falling off or out of the frame. This frame, with the glass, is supported and moved by two or more men, with the ends $c\ c$ resting on the floor and partly supporting the frame and glass, which is then slipped along on the floor until the bottom of the plate, resting against the bar D, is brought directly in front of the opening to be filled and closed by the glass, the bar D having been previously adjusted so that its inner or top edge, upon which rests the bottom edge of the glass, (the outer edge of which is indicated by dotted lines,) will be on an exact level with the lower rabbet of the frame into which the glass is to be set.

$h\ h$ represent two pieces of canton-flannel folded two or three or several thicknesses and placed between the lower or bottom edge of the glass and the adjustable bar D, the flannel being folded with the fuzzy or woolly side next to the glass, with projecting ends long enough to be readily and securely grasped and held by two men. When all is ready and the frame and glass lying on the floor in front of the frame into which the glass is to be set, the frame is raised (with the ends $b\ b$ resting on the floor) until it stands nearly in a perpendicular position. Then one man takes hold of the projecting ends of the canton-flannel on the inside of the glass and another man takes hold of the ends of the canton-flannel on the outside of the glass and frame into which it is to be set, and the glass is carefully carried into place at the bottom over the short space to be borne, and rests upon the flannel strips and on the bottom rabbet of the frame or sash. The top of the glass is then carried into place, the bottom being held firmly while the top is moved into position. The canton-flannel strips are then cut off on the inside of the glass and the remaining portions pulled out from the outside of the window sash or frame, thus completing the operation of setting the glass.

The canton-flannel is a decidedly novel feature for the above-described purpose, as experience has demonstrated that the edge of the glass is likely to or will cut anything but said flannel, which, when arranged with the fuzzy or woolly side next to the edge of the glass, will not cut.

The object of having the bar E adjustable is for the purpose of adapting the frame A to different widths of glass.

In order to strengthen the long bars or beams B B, metallic bars $a\ a$, of sufficient thickness and width and extending to nearly the ends of the bars or beams B, are screwed or otherwise secured on the under sides thereof.

Having thus fully described my invention, what I claim as new, and desire to secure by Letters Patent, is—

1. A device for conveying and setting glass, consisting of a rectangular frame having an adjustable bar or rest, D, substantially as and for the purpose specified.

2. A device for conveying and setting glass, consisting of a rectangular frame having the adjustable bars or rests D E, substantially as and for the purpose specified.

3. A frame for conveying and setting glass, having a rest or bar, D, in combination with one or more strips of canton-flannel, arranged with the fuzzy or woolly side thereof next to the edge of the glass and between it and the rest D, substantially as and for the purpose herein shown and described.

In testimony that I claim the foregoing I have hereunto set my hand this 18th day of March, 1881.

IRA LACKEY.

Witnesses:
H. E. HADLEY,
THOS. SLADE.